р

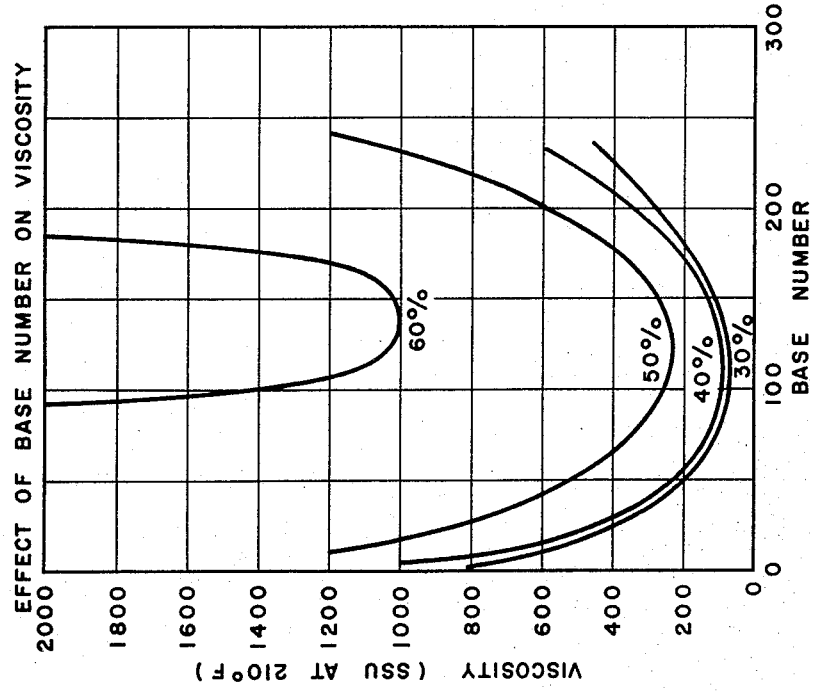
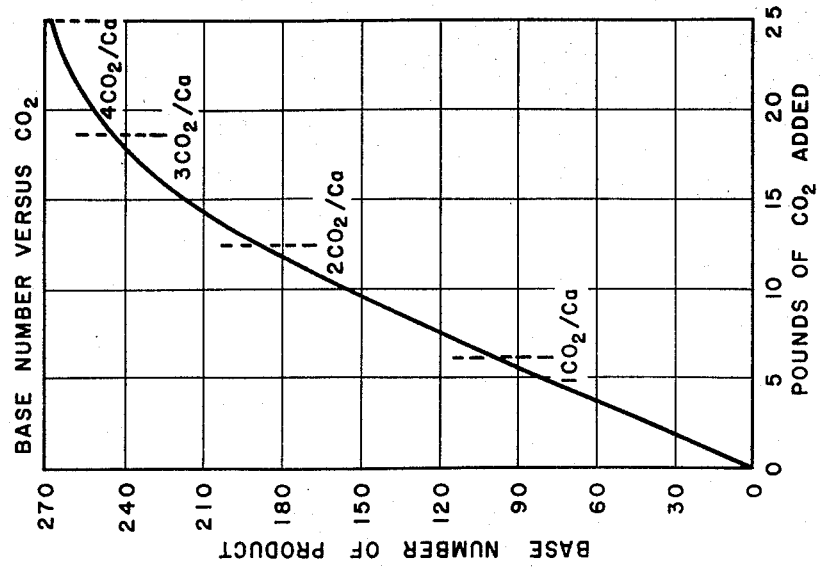
INVENTORS.
ROBERT L. CARLYLE
EARL F. MORRIS
BY
*Floyd Trimble*
ATTORNEY

United States Patent Office 2,956,018
Patented Oct. 11, 1960

2,956,018
METAL CONTAINING ORGANIC COMPOSITIONS AND METHOD OF PREPARING THE SAME

Robert L. Carlyle, Lake Jackson, Tex., and Earl F. Morris, Ponca City, Okla., assignors to Continental Oil Company, Ponca City, Okla., a corporation of Delaware Original application July 1, 1955, Ser. No. 519,554. Divided and this application Apr. 15, 1957, Ser. No. 653,264

9 Claims. (Cl. 252—18)

This invention relates to stable oil-dispersible basic metal containing organic compositions and methods of making the same. Such compositions possessing increased detergency and increased reserve basicity find especial utility as additives in lubricating oils and likewise are useful for producing corrosion inhibiting compositions and similar purposes.

It is believed that in heavy duty detergent type lubricating oil compositions for use in diesel and like internal combustion engines, at least two requirements must be met by such oils (in addition to lubricity, stability, and the like) if a high degree of engine cleanliness is to be maintained. First, the oil must possess the power to disperse insolubles formed by fuel combustion or oil oxidation, or both; and secondly, the oil must be capable of neutralizing acidic lacquer precursors formed by either oil oxidation or interaction of the oil with sulfur acids produced from fuel combustion, or both of these conditions. The detergents generally employed in oils for engine operation with high sulfur fuel (e.g., conventional metal sulfonates) are only mildly alkaline and their basicity is rapidly depleted during engine operation.

It is accordingly a principal object of this invention to provide metal containing, stable dispersions of inorganic compounds in mineral oil and process for the production of such dispersions.

It is another object of our invention to provide highly useful mineral oil compositions utilizing such dispersions.

Other objects of our invention will appear as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises the process of producing stable dispersions of a basic metal containing compound in oleaginous compositions which comprises:

a. Adding an inorganic compound to an aliphatic alcohol wherein the cation of said inorganic compound is selected from the group consisting of sodium, barium, and calcium, b. Forming an oil insoluble complex by passing carbon dioxide through the alcohol-inorganic compound mixture, c. Dispersing the resulting complex in an oleaginous carrier containing an oil soluble dispersing agent, and d. Heating the resulting dispersion whereby said alcohol is removed and said complex is decomposed.

Alternatively steps "b" and "c" above may be interchanged. That is, the alcohol-inorganic compound mixture may be added to the oleaginous carrier containing the oil soluble dispersing agent after which the oil insoluble complex of said inorganic compound mixture may be formed by passing carbon dioxide therethrough. Steps "b" and "c" would then be written as follows:

b. Adding the alcohol-inorganic compound mixture to an oleaginous carrier containing an oil soluble dispersing agent, c. Forming an oil insoluble complex of said alcohol-inorganic compound mixture by passing carbon dioxide through the alcohol-inorganic compound-oleaginous carrier-dispersing agent mixture.

While we do not wish to be bound by any particular theory as to the structure of this complex, we believe that the alcohol insoluble complex formed by passing carbon dioxide through the alcohol-inorganic compound mixture has the following structure:

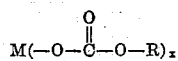

where:

M = a metal selected from the class of alkali and alkaline earth metals
x = the valence of M
R = a lower alkyl group In support of this theory the following is submitted:

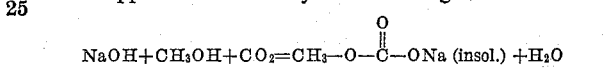

Carbon dioxide, sodium, and oxygen analysis of the product formed by the above identified reaction indicated that it had the formula $NaC_2H_3O_3$. E. Szarvasy, Ber. 1897, 30, 1836, prepared and identified

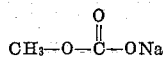

as the reaction product of $CH_3OH_a + CO_2$. Infrared spectra analysis of the product prepared in accordance to the method of E. Szarvasy and that prepared by the reaction of sodium hydroxide, methyl alcohol and carbon dioxide show they are identical. J. Dumas and E. Peligot, Ann., 1840, 35, 283, reported that a compound having the structure

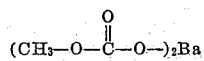

was formed by reacting barium oxide, methyl alcohol and carbon dioxide. It should be noted that the different inorganic compounds exhibit different solubility characteristics in alcohol as follows: Sodium hydroxide is generally not soluble in alcohol, calcium oxide is insoluble in alcohol, and barium oxide is soluble in methanol. The complex formed, however, by passing carbon dioxide through the alcohol-inorganic compound mixture is always oil insoluble. Our analysis indicates that the product formed by reacting these three components is as follows:

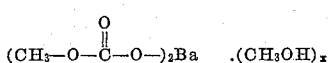

On heating the complex prepared in accordance to our invention in the presence of moisture, the reaction proceeds as follows:

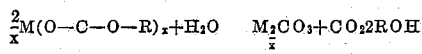

Before proceeding with specific examples illustrating our invention, it may be well to indicate in general the nature of the materials required in the process.

INORGANIC COMPOUNDS

Sodium, barium, and calcium oxides and hydroxides (including hydrates), may be used in the process of this invention. Other suitable inorganic compounds are the sodium, barium, and calcium salts of acids having an ionization constant of less than $1 \times 10^{-7}$. Specific acids falling within this class include boric acid, hydrocarbonic acid, phenol, and thiocarbonic acid.

OLEAGINOUS CARRIERS

Oleaginous carriers which may be used include mineral lubricating oil obtained by any of the conventional refining procedures, vegetable oils such as corn oil, cottonseed oil, castor oil, etc., animal oils such as lard oil, sperm oil, etc., and synthetic oils such as alkylene polymers. Specific examples of synthetic oils are polymers of propylene, polyoxyalkylenes such as polyoxypropylene and esters of polyoxypropylene, dicarboxylic acid esters such as esters of adipic and azelaic acids with alcohols such as butyl, 2-ethyl hexyl and dodecyl alcohols, and esters of acids of phosphorus such as diethyl ester of decanephosphonic acid and tricresyl phosphate. If desired, the oleaginous carriers may be diluted with a solvent to reduce the viscosity. Suitable solvents include petroleum naphtha or hydrocarbons such as hexane, heptane, octane, benzene, toluene, or xylene.

DISPERSING AGENTS

A variety of oil-soluble dispersing agents may be used. Suitable dispersing agents include both anionic and nonionic forms. The sulfontes, organic phosphorus compounds, phosphorus sulfide treated olefins, and metal soaps of carboxylic acids are typical ionic dispersing agents.

SULFONATES

Sulfonates which are suitable are oil-soluble and include alkyl sulfonates, alkaryl sulfonates, the so-called mahogany or petroleum soaps, and the like. The mahogany soaps include particularly the oil-soluble aromatic sulfonates from petroleum. Many of the aromatic sulfonates have cycloalkyl (i.e., naphthenic) groups in the side chains attached to the benzene ring. The mahogany soaps may include non-aromatic sulfonates produced in conventional sulfuric acid refining of lubricating oil distillates and from the industrial use of fuming sulfuric acid in the refining of petroleum. The industrial production of oil-soluble mahogany sulfonates from petroleum is well understood in the art and is described in the literature. Normally, the alkyl sulfonates require about 24 carbon atoms for oil solubility. The alkaryl sulfonates, however, require an alkyl portion totalling only about 18 carbon atoms. To attain the requisite oil solubility, therefore, requires that the hydrocarbon portion of the sulfonate have a molecular weight between about 350 and 1,000. Preferably this molecular weight is between 400 and 700. In this manner more than one metal may be introduced into the finished product, the excess metal introduced into the product being different from the metal of the sulfonate. Particularly useful sulfonates include diwaxbenzene sulfonates, diwaxtoluene sulfonates, and postdodecylbenzene sulfonates; barium and calcium diwaxbenzene sulfonates being preferred. The wax used in making the wax aromatic sulfonate is obtained from different sources of crude petroleum oil. Various grades of paraffin wax are made with different melting points. The 126–128° F. (52.2–53.3° C.) melting point wax is a mixture of organic compounds with the molecular weight averaging in the range of 330–340. The average carbon content of this mixture of organic compounds will be around 24. As the melting point of the wax decreases the carbon content of the mixture will average as low as 18 or a little lower.

Other sulfonates which may be used in the process of this invention include, for example, mono- and poly-wax substituted naphthalene sulfonates, diphenyl ether sulfonates, naphthalene disulfide sulfonates, diphenyl amine sulfonates, dicetyl thianthrene sulfonates, dilauryl beta-naphthol sulfonates, dicapryl nitronaphthalene sulfonates, unsaturated paraffin wax sulfonates, hydroxy substituted paraffin wax sulfonates, tetra-amylene sulfonates, mono- and poly-chlorosubstituted paraffin wax sulfonates, nitrosoparaffin wax sulfonates; cycloaliphatic sulfonates such as lauryl-cyclo-hexyl sulfonates, mono- and poly-wax substituted cyclo-hexyl sulfonates, and the like. The expression "petroleum sulfonate" is intended to cover all sulfonates derived from petroleum product.

Instead of using the foregoing sulfonates as such in the invention, we may also form those sulfonates in situ by adding the corresponding sulfonic acid to the mixture which then can be converted to the sulfonate by any convenient means. Generally, for convenience, such a modification is preferred. When this modified procedure is followed, we add from about 1½ to 6 times the quantity of the oil-insoluble inorganic compound than will react with the sulfonic acid thus insuring the presence of an inorganic compound in the product as a dispersoid.

PHENOLIC COMPOUNDS

The phenolic organic compounds which may be used are the free oil-soluble phenolic compounds or the metal phenates thereof. Oil-solubility is imparted to such phenolic compounds by the presence in the molecule of at least nine aliphatic carbon atoms. Specific examples are: 3,5,5-trimethyl-n-hexyl phenol, n-decyl phenols, cetyl phenols, nonyl phenols, and the like; alkaryl substituted phenols such as alkyl-phenyl phenols; polyhydroxy alkyl-aromatic compounds such as 20-carbon alkyl resorcinol, or poly-hydroxy alkyl-benzenes, such as, for example, octyl catechol, tri-iso-butyl pyrogallol, and the like; mono-hydroxy alkyl-naphthalenes such as 12-carbon alkyl alpha naphthol, and the like. Alkyl substituted phenol sulfides containing at least 5-alkyl carbon atoms such as iso amyl or nonyl phenol disulfide and the like may be used. Dinonyl phenol and nonyl phenol disulfide have been found to be preferred materials.

ORGANIC PHOSPHORUS COMPOUNDS

Useful organic phosphorus compounds include tri- and penta-valent organic phosphorus acids and the corresponding thiophosphorus acids and their oil-soluble salts, as, for example, phosphoric acids and thiophosphoric acids, phosphinic acids and thiophosphinic acids, phosphonic acids and thiophosphonic acids, and the like and the oil-soluble salts thereof. The organic radicals substituted may be aliphatic, cycloaliphatic, aromatic, substituted aromatic, and the like and preferably contain a total of at least about 12 carbon atoms. Suitable phosphoric acid compounds include, for example, mono-wax phosphorus acids, monooctadecyl phosphorus acid, monododecyl phosphorus acid, methyl cyclohexyl phosphite, capryl phosphite, decapryl phosphite, zinc monowaxbenzene phosphonate, zinc dodecylbenzene phosphonate, and the like. Useful organic thiophosphorus acids include dicapryl dithiophosphoric acids, dilauryl dithiophosphoric acids, di-(methyl cyclohexyl) dithiophosphorus acids, lauryl monothiophosphoric acids, diphenyl dithiophosphoric acids, ditolyl monothiophosphoric acids, di-(iso-propyl-phenyl) monothiophosphoric acids, and the like, and the oil-soluble salts thereof.

PHOSPHORUS SULFIDE TREATED OLEFINS

The phosphorus sulfide treated olefins and their oil-soluble metal salts which are suitable for use include those customarily used in lubricating oil formulations as corrosion inhibitors and/or detergents. Specifically, they include the potassium-polyisobutylene-phosphorus sulfide products described by U.S. Patent 2,316,080, issued on April 6, 1943, to Loane and Gaynor, and a similar material containing no metal made by addition of a phosphorus sulfide to wax olefins as described in U.S. Patent 2,516,119, issued on July 25, 1950, to Hersh. This latter preferred material is made by first forming wax olefins from paraffin waxes by halogenation and dehydrohalogenation and subsequently treating the olefins with a phosphorus sulfide, preferably phosphorus pentasulfide.

METAL SOAPS OF CARBOXYLIC ACIDS

Examples of specific soaps which are preferred for use because of cost and availability include metal soaps of naphthenic acids and the higher fatty acids.

Suitable naphthenic acid radicals include substituted cyclopentane mono- and di-carboxylic acids and cyclohexane mono- and di-carboxylic acids having at least about 15 carbon atoms for oil solubility, for example, cetyl cyclohexane carboxylic acids, dioctyl cyclopentane carboxylic acids; and dilauryl deca-hydronaphthalene carboxylic acids, and the like, and oil-soluble salts thereof.

Suitable oil-soluble fatty acid radicals include those in which there are present at least about 8 carbon atoms. The barium salts of the unsaturated and branched chain acids being oil-soluble with fewer aliphatic carbon atoms than the saturated acids. Specific examples are: 2-ethyl hexoic acid, linoleic acid, and the like. Substituted fatty acids which are useful may include chlorostearic acids, ricinoleic acids, and the like.

Similarly as in the case of the sulfonates, we may, instead of using the foregoing carboxylic acid soaps as such in the invention form those soaps in situ by adding the corresponding carboxylic acid to the mixture which then can be converted to the soap by any convenient means. When this latter procedure is followed, we add from about 1½ to 6 times the quantity of the oil-insoluble inorganic compound than will react with the carboxylic acid thus insuring the presence of an inorganic compound in the product as a dispersoid.

NONIONIC OIL-SOLUBLE SURFACE ACTIVE AGENTS

Suitable nonionic oil-soluble surface active agents for use in the process of my invention include: polyethylene glycol oleate, obtainable from General Aniline and Film Corporation under the trade name "Antarox B-100"; polyoxyethylene lauryl alcohol, obtainable from Atlas Powder Company under the trade name "Brij-30"; a condensation product of a polyglycol, fatty acid, and sodium sulfosuccinate acid obtainable from the Planetary Chemical Company under the trade name "D-Spers-O, W. PS, MO, Cl"; a lanolin derivative obtainable from the Atlas Powder Company under the trade name "G-1493"; a long chain fatty ester containing multiple ether linkages obtainable from Synthetic Chemicals, Incorporated, under the trade name "Mulsor"; a fatty amino compound obtainable from the Nopco Chemical Company under the trade name "Nopco 1219-A"; an alkylated aryl polyether alcohol obtainable from the Rohm and Haas Company under the trade name "Triton X-45"; and a dimeric alkylated aryl polyether alcohol obtainable from the Rohm and Haas Company under the trade name "Triton X-155."

CATIONIC OIL-SOLUBLE SURFACE ACTIVE AGENTS

Suitable cationic oil-soluble surface active agents for use in the process of my invention include: a substituted oxazoline, obtainable from Commercial Solvents Corporation under the trade name "Alkatergl C, O, OX"; heterocyclic tertiary amine

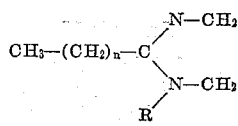

obtainable from Alrose Chemical Company under the trade name "Alro amines, C, O, S"; a secondary fatty acid amine, obtainable from Armour and Company under the trade name "Armeen 2C, 2HT"; quaternary ammonium compounds of the formula RR'—N—(CH$_3$)$_2$Cl, obtainable from Armour and Company under the trade name "Arquad 2C, 2HT"; and a modified cationic agent, obtainable from Alrose Chemical Company under the trade name "Detergent I-160."

Whenever the term "metal" is used throughout the foregoing enumeration of the various oil-soluble surface active agents, we intend to include only the metals of groups I and II of the periodic table. In addition to the specifically enumerated salts, we may also use the corresponding mono- and poly halo- and particularly the mono and poly chloro derivatives.

In some cases it may be desirable to an inert solvent such as naphtha or other relatively low boiling hydrocarbon to reduce the viscosity of the mixture.

All of the base numbers of the products of this invention were determined by the acetic acid titration method which utilizes glacial acetic acid as the solvent and a solution of perchloric acid in glacial acetic acid as the titrant. The method is especially adapted for determinations of this type since equilibria are obtained rapidly. The procedures for carrying out acetic acid titrations are generally outlined in Analytical Chemistry, vol. 23, No. 2, February 1951, page 337, and vol. 24, No. 3, March 1952, page 519.

In order to disclose the nature of the present invention still more clearly the following illustrative examples will be given in which parts are parts by weight. In the examples, the numerical values preceding pale oil designates the S.S.U. value at 100° F.

Example 1

Five parts of calcium oxide (85 percent active CaO) was suspended in 80 parts of methanol containing 1% water and the suspension blown with carbon dioxide until the heat of reaction had subsided. The product was filtered and 33 parts of a solid water soluble unstable compound was obtained which by X-ray and infrared analysis was found not to be calcium carbonate, calcium bicarbonate, or calcium oxide. On standing, this compound slowly lost carbon dioxide and methanol leaving calcium carbonate. This compound had a composition corresponding to:

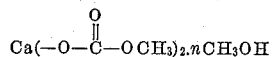

The foregoing compound was added to 95 parts of a 50 percent solution of neutral calcium postdodecylbenzene sulfonate in 170 pale oil. The mixture was agitated to suspend the calcium complex and heated to 150° C. to decompose the calcium complex and distill off methanol. The hazy product obtained was centrifuged to remove suspended material (present originally as impurities in the calcium oxide) whereupon a bright oil-soluble material was obtained having a base number of 86.

A similar product was obtained when a complex prepared as above was added to a 50 percent solution of neutral barium postdodecylbenzene sulfonate.

Example 2

There was suspended in 130 parts of methanol containing 1% water 8.25 parts of calcium oxide and the suspension blown with carbon dioxide while maintaining the temperature at about 25° C. The resulting suspension was filtered and suspended in 92.5 parts of a postdodecylbenzene sulfonic acid solution in 170 pale oil (1.22 meq. of sulfonic acid per part of solution). The suspension was heated to 150° C. to decompose the calcium complex and distill off methanol. The product was agitated with filter aid and filtered yielding a bright oil-soluble material having a base number of 88.

Example 3

Into 90 parts of a methanolic solution of calcium hydrosulfide (1.92 equivalents of calcium per part) was bubbled carbon dioxide until hydrogen sulfide evolution ceased. The suspension obtained was filtered and added to 95 parts of a 50 percent solution of neutral calcium postdodecylbenzene sulfonate in 170 pale oil. The calcium complex was decomposed as in previous examples and then centrifuged. The bright oil-soluble product obtained had a base number of 85.

*Example 4*

Into 100 parts of solution prepared by dissolving 25.8 parts of barium oxide in 120 parts of methanol containing 1% water was bubbled carbon dioxide until the heat of reaction had subsided. The white precipitate which formed was filtered. It weighed 55.5 parts and by X-ray and infrared analysis was found not to be barium carbonate, barium bicarbonate, or barium oxide. On standing, this complex slowly lost carbon dioxide and methanol. Heat was found to accelerate this decomposition. The complex had a composition corresponding best to:

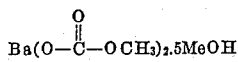

$$Ba(O-\overset{O}{\underset{\|}{C}}-OCH_3)_2 \cdot 5MeOH$$

Fifty parts of the complex were added to 155 parts of a 50 percent solution of barium postdodecylbenzene sulfonate in 170 pale oil. The mixture was agitated vigorously and heated rapidly to 150° C. to decompose the complex and distill off methanol. The product was centrifuged yielding a clear bright oil-soluble material having a base number of 57.

*Example 5*

One hundred parts by volume of a methanol solution saturated with barium hydroxide Ba(OH)$_2$.H$_2$O, was treated with carbon dioxide until heat of reaction had subsided. After standing, the supernate alcohol was decanted and the remaining slurry added to 70 parts of a solution of 22 percent diwaxbenzene sulfonic acid in 170 pale oil. The mixture was agitated and heated to 160° C. to remove methanol. The resulting bright product had a base number of 56.

*Example 6*

In 80 parts of methanol was suspended 6.4 parts of finely divided calcium hydroxide. The mixture was treated with carbon dioxide under a pressure of about 30 p.s.i.g. for about two hours. The resulting suspension was filtered and the complex added to 95 parts of a 50 percent solution of calcium postdodecylbenzene sulfonate in 170 pale oil and heated rapidly to 150° C. The resulting material was filtered hot through filter aid and yielded a clear, bright, product having a base number of 90.

*Example 7*

Example 6 was repeated with the exception that the complex was added to 21 parts of a 50 percent solution of calcium postdodecylbenzene sulfonate in 170 pale oil and 60 parts of benzene. The mixture was stirred vigorously and rapidly heated to 150° C. to distill off benzene and methanol. The product was a bright, clear, product having a base number of 250.

*Example 8*

Into 80 parts of isopropanol were suspended 6.4 parts of calcium hydroxide and carbon dioxide bubbled in for two hours. The resulting suspension, a complex containing calcium, carbon dioxide, and isopropanol, was filtered and added to 95 parts of a 50 percent solution of calcium postdodecylbenzene sulfonate in 170 pale oil and heated to 150° C. On filtering through filter aid a clear, bright, product having a base number of 82 was obtained.

*Example 9*

Into a solution of 50 parts of polyoxyethylene sorbitol-4,5-oleate obtainable under the trade name "Atlas G-2859" from the Atlas Powder Company in 80 parts of 170 pale oil were added 33 parts of solid calcium-carbon dioxide-methanol complex as prepared in Example 1. The mixture was agitated vigorously and heated to 150° C. to decompose the complex and distill off methanol. The product obtained was centrifuged whereupon a bright oil-soluble material was obtained having a base number of 59.

*Example 10*

Into a solution of 50 parts of calcium postdodecylbenzene sulfonate in 150 parts of di-2-ethylhexylazelate were added 33 parts of solid calcium-carbon dioxide-methanol complex as prepared in Example 1. The mixture was agitated vigorously and heated to 150° C. to decompose the complex and distill off methanol. The product obtained was centrifuged whereupon a bright oil-soluble material was obtained having a base number of 38.

*Example 11*

Example 1 was repeated except that anhydrous methanol was used in place of methanol containing 1 percent water. The product obtained had a base number of 21.

*Example 12*

Example 1 was repeated except that methanol containing 0.5 percent water in place of anhydrous methanol was used. The product obtained had a base number of 21.

Examples 11 and 12 show that under conditions where the alkaline earth oxide is not hydrated or hydrated only to the extent of ¼ mole of H$_2$O per mole of alkaline earth oxide, base numbers are obtained which are much lower than expected from the amount of alkaline earth oxide used. Example 1 shows that under conditions where the alkaline earth oxide is hydrated to the extent of ½ mole of H$_2$O per mole of alkaline earth oxide, base numbers are obtained as expected from the amount of alkaline earth oxide used.

*Example 13*

There were suspended in 80 parts of methanol 24 parts of calcium hydroxide. The suspension was agitated vigorously and 400 parts of 50 percent solution of postdodecylbenzene sulfonic acid in 170 pale oil added. The mixture was treated with carbon dioxide for 1½ hours and then heated to 150° C. to distill solvents and decompose the calcium complex. After filtering the product had a base number of 83. Example 15 demonstrates how calcium overbased oils can be prepared from alcohol insoluble calcium hydroxide.

*Example 14*

There were suspended in 17.5 parts of methanol 5 parts of calcium hydroxide. The suspension was agitated vigorously and 40 parts of a 50% solution of postdodecylbenzene sulfonic acid in 170 pale oil plus 42.5 parts of naphtha were added thereto. The mixture was blown with carbon dioxide until 5 parts of the latter were added thereto and then the resulting mixture was heated to 150° C. to evaporate the solvents and decompose the calcium complex. After filtering the product had a base number of 70 and it analyzed 4.4% calcium and 3.4% sulfur.

Similar results were obtained when ethanol, normal butanol and normal amyl alcohol were substituted for the methanol used in Example 14.

*Example 15*

There were suspended in 44.4 parts of methanol 12 parts of calcium hydroxide. The suspension was agitated vigorously and 36 parts of a 50% solution of postdodecylbenzene sulfonic acid in 170 pale oil plus 38.4 parts of naphtha were added thereto. The mixture was blown with carbon dioxide until 13.4 parts of the latter were added. The reaction mixture was then heated to 150° C. to evaporate the solvents and decompose the calcium complex. After filtering the product had a base number of 190 and analyzed 7.9% calcium and 3% sulfur.

*Example 16*

The procedure of Example 15 was repeated with the exception that the mixture was blown with 20 parts rather than 13.4 parts of carbon dioxide. This product after filtering had a base number of 255.

*Example 17*

There were suspended in 44.4 parts of methanol 12 parts of calcium hydroxide. The suspension was agitated vigorously and 35 parts of a 50% solution of postdodecylbenzene sulfonic acid in 170 pale oil plus 39.4 parts of naphtha were added thereto. The mixture was blown with 29 parts of carbon dioxide after which the reaction mixture was heated to 150° C. to evaporate the solvents and decompose the calcium complex. After filtering the product had a base number of 280 and analyzed 10.3% calcium and 2.7% sulfur.

*Example 18*

There were suspended in 26.5 parts of methanol 8.2 parts of calcium hydroxide. The suspension was agitated vigorously and 49.3 parts of a 50% solution of postdodecylbenzene sulfonic acid in 170 pale oil plus 62.7 parts of naphtha were added thereto. The mixture was blown with 20 parts of carbon dioxide after which it was heated to 150° C. to evaporate the solvents and decompose the calcium complex. After filtering the product had a base number of 134 and it analyzed 6.7% calcium and 3.3% sulfur.

*Example 19*

There were suspended in 18 parts of methanol 5.5 parts of calcium hydroxide. The suspension was agitated vigorously and 49.3 parts of a 50% solution of postdodecylbenzene sulfonic acid in 170 pale oil plus 62.7 parts of naphtha were added thereto. The mixture was blown with 13 parts of carbon dioxide and then heated to 150° C. to evaporate the solvents and decompose the calcium complex. After filtering the product had a base number of 70 and analyzed 4.5% calcium and 3.9% sulfur.

Lubricating compositions were prepared by adding 5 parts of the products of Examples 1 to 8, 10 and 13 to 19, to 95 parts of a blend of SAE 30 lubricating oil containing a small amount of added phosphorous pentasulfide treated wax olefin. Each of the mixtures prepared as above was then heated to about 140° F. with agitation to obtain a uniform blend.

The lubricating compositions thus produced together with the SAE 30 lubricating oil containing the phosphorous pentasulfide treated wax olefin as a control were subjected to cub engine tests. This test may be described briefly as follows: Four-cylinder cub gasoline engines (International's light tractor engine adapted to a stand test) are run for 40 hours at 2,500 r.p.m. with 11 brake horsepower output and oil temperature of 280° F. and a jacket temperature of 200° F. After completion of the run, the engines are disassembled and the parts thereof are inspected. During the same operation one run was made using the SAE 30 oil containing the phosphorous pentasulfide treated wax olefin as a control. The engines using the lubricating oil compositions containing the products of this invention as additives showed less wear than the engine using the control lubricant.

The postdodecylbenzene sulfonic acid used herein was that obtained by sulfonating postdodecylbenzene. The various postdodecylbenzene sulfonates used herein were prepared by neutralizing postdodecylbenzene sulfonic acid. Postdodecylbenzene comprises monoalkylbenzene and dialkylbenzenes in the approximate ratio of 2:3. Its typical physical properties are as follows:

Specific gravity at 38° C. _____ 0.8649
Average molecular weight _____ 385
Percent sulfonatable _____ 88
A.S.T.M., D–158 Engler:
    I.B.P. _____ ° F.___ 647
    5 _____ ° F.___ 682
    50 _____ ° F.___ 715
    90 _____ ° F.___ 760
    95 _____ ° F.___ 775
    F.B.P. _____ ° F.___ 779
Refractive index at 23° C. _____ 1.4900

Viscosity at:
    −10° C. _____ centipoises____ 2800
    20° C. _____ 280
    40° C. _____ 78
    80° C. _____ 18
Aniline number _____ ° C.___ 69
Pour point _____ ° F.___ −25

In brief, our experiments have demonstrated the following:

(1) Base numbers of the order of about 100 to 130 give products having the optimum viscosity, (2) Eighty-four percent utilization of $Ca(OH)_2$ and 24 percent utilization of carbon dioxide are optimum, (3) Temperature of carbonation should be within the range of about 80 to 90° F. for the optimum base number and solubility, (4) There is no apparent advantage in using a weight ratio of alcohol to metal greater than 6:1.

The procedure of Example 1 was repeated with the exception that varying amounts of carbon dioxide were used during the blowing process. These results are summarized in Figure 1. The base number of the product increases rapidly with the amount of carbon dioxide used up to about 20 pounds of carbon dioxide per pound of metal; thereafter the base number increases very slowly with large increases in the amount of carbon dioxide used.

Figure 2 shows that viscosity reaches a minimum at a base number within the range of about 100 to 130.

This application is a division of our copending application Serial No. 519,554 filed July 1, 1955, and now abandoned, title same as above.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. The process of preparing a stable dispersion of a basic metal compound in a liquid lubricating oil composition consisting of:

*a.* adding an inorganic compound to an aliphatic monohydric alcohol containing 1 to 5 carbon atoms wherein the cation of said inorganic compound is selected from the group consisting of sodium, barium, and calcium and the anion is selected from the group consisting of oxide, hydroxide, and sulfide radicals.

*b.* forming an oil insoluble complex by passing carbon dioxide through the alcohol-inorganic compound mixture in the presence of from 0.5 to 1.0 mole of water per mole of inorganic compound.

*c.* dispersing the resulting complex in a liquid lubricating oil containing an oil soluble dispersing agent selected from the class consisting of sulfonic acids and metal sulfonates and characterized further in that the amount of said inorganic compound varies from about 1½ to 6 times that required to react with the sulfonic acid where this material is used as the dispersing agent and ½ to 5 times the number of chemical equivalents of the dispersing agent where said dispersing agent is a salt of a sulfonic acid, and d. heating the resulting dispersion whereby said alcohol is removed and said complex is decomposed.

2. The process of claim 1 in which the metallic radical of the inorganic compound is sodium.

3. The process of claim 1 in which the metallic radical of the inorganic compound is barium.

4. The process of claim 1 in which the metallic radical of the inorganic compound is calcium.

5. The process of claim 1 in which the aliphatic alcohol is methanol.

6. The process of claim 1 in which the aliphatic alcohol is ethanol.

7. The process of claim 1 in which the aliphatic alcohol is butanol.

8. The process of claim 1 in which the aliphatic alcohol is amyl alcohol.

9. The process of claim 1 in which the aliphatic alcohol is isopropanol.

References Cited in the file of this patent

UNITED STATES PATENTS

| | | |
|---|---|---|
| 2,079,051 | Sullivan et al. | May 4, 1937 |
| 2,413,311 | Cohen | Dec. 31, 1946 |
| 2,501,732 | Mertes | Mar. 28, 1950 |
| 2,585,520 | Van Ess et al. | Feb. 12, 1952 |
| 2,606,872 | Gasser et al. | Aug. 12, 1952 |
| 2,616,924 | Asseff et al. | Nov. 4, 1952 |
| 2,671,758 | Vinograd et al. | Mar. 9, 1954 |
| 2,676,925 | Lindstrom et al. | Apr. 27, 1954 |